(12) United States Patent
Yacobi

(10) Patent No.: US 7,581,287 B2
(45) Date of Patent: Sep. 1, 2009

(54) VACUUM CLEANER WITH SPIRAL AIR GUIDE

(75) Inventor: Michael S. Yacobi, Lexington, KY (US)

(73) Assignee: Panasonic Corporation of North America, Secaucus, NJ (US)

(*) Notice: Subject to any disclaimer, the term of this patent is extended or adjusted under 35 U.S.C. 154(b) by 88 days.

(21) Appl. No.: 11/453,124

(22) Filed: Jun. 14, 2006

(65) Prior Publication Data

US 2007/0289089 A1 Dec. 20, 2007

(51) Int. Cl.
A47L 9/10 (2006.01)

(52) U.S. Cl. .............................. 15/353; 55/392; 55/394

(58) Field of Classification Search ................... 15/347, 15/350–353; 55/392, 394; D15/122, 138; A47L 9/10
See application file for complete search history.

(56) References Cited

U.S. PATENT DOCUMENTS

| | | | |
|---|---|---|---|
| 6,003,196 A | 12/1999 | Wright et al. | |
| 6,026,540 A | 2/2000 | Wright et al. | |
| 6,070,291 A | 6/2000 | Bair et al. | |
| 6,260,234 B1 | 7/2001 | Wright et al. | |
| 6,341,404 B1 | 1/2002 | Salo et al. | |
| 6,353,963 B1 | 3/2002 | Bair et al. | |
| 6,398,834 B2 * | 6/2002 | Oh ............................. 55/424 | |
| 6,401,295 B2 | 6/2002 | Bair et al. | |
| 6,428,589 B1 * | 8/2002 | Bair et al. .................... 55/318 |
| 6,436,160 B1 | 8/2002 | Stephens et al. | |
| 6,463,622 B2 | 10/2002 | Wright et al. | |
| 6,588,054 B2 | 7/2003 | Bair et al. | |
| 6,588,055 B2 | 7/2003 | Bair et al. | |
| 6,591,446 B2 | 7/2003 | Bair et al. | |
| 6,735,815 B2 | 5/2004 | Bair et al. | |
| 6,735,817 B2 | 5/2004 | Wright et al. | |
| 6,745,432 B2 | 6/2004 | Wright et al. | |
| 6,757,933 B2 * | 7/2004 | Oh et al. ....................... 15/353 |
| D495,347 S * | 8/2004 | Erbach ...................... D15/138 |
| 6,818,036 B1 | 11/2004 | Seaman | |
| 6,848,146 B2 | 2/2005 | Wright et al. | |
| 6,989,039 B2 | 1/2006 | Vuijk | |
| 6,994,740 B2 | 2/2006 | Gammack et al. | |
| 7,047,593 B2 | 5/2006 | Kitamura et al. | |

FOREIGN PATENT DOCUMENTS

| | | |
|---|---|---|
| EP | 1 714 703 A2 | 10/2006 |
| EP | 1 779 759 A2 | 5/2007 |
| EP | 1 779 761 A2 | 5/2007 |

* cited by examiner

Primary Examiner—David A Redding
(74) Attorney, Agent, or Firm—King & Schickli, PLLC

(57) ABSTRACT

A vacuum cleaner includes a housing having a suction inlet, a dirt collection vessel carried on the housing and a suction generator carried on the housing. The dirt collection vessel includes a dirt collection chamber and a spiral air guide providing a spiral air path to improve cleaning efficiency. The suction generator is provided in fluid communication with the suction inlet, the dirt collection vessel and the spiral air guide.

20 Claims, 5 Drawing Sheets

VACUUM CLEANER WITH SPIRAL AIR GUIDE

TECHNICAL FIELD

The present invention relates generally to the floor care equipment field and, more particularly, to a vacuum cleaner equipped with a dirt collection vessel including a dirt collection chamber and a spiral air guide providing a spiral air path.

BACKGROUND OF THE INVENTION

Bagless vacuum cleaner technology has long been known in the art. Japanese patent applications 56-136642 and 56-136650 both published in 1981 disclose an upright vacuum cleaner with a dirt collection chamber that removably connects to an opening of the main unit to facilitate user convenience during the emptying of the cleaner. A removable filter fills an opening at the bottom of the dust chamber and serves to separate dirt and dust from air drawn through the vacuum cleaner by the fan and motor assembly.

The present invention relates to a vacuum cleaner that incorporates a dirt collection vessel including a dirt collection chamber and a spiral air guide that provides a spiral air path for improved cleaning efficiency.

SUMMARY OF THE INVENTION

In accordance with the purposes of the present invention as described herein, an improved vacuum cleaner is provided. That vacuum cleaner comprises a housing including a suction inlet and both a dirt collection vessel and a suction generator carried on the housing. The dirt collection vessel includes a dirt collection chamber. The vacuum cleaner includes a spiral air guide providing a spiral air path that enhances cleaning efficiency. The suction generator is provided in fluid communication with the suction inlet, the dirt collection vessel and the spiral air guide.

The dirt collection vessel includes a first dirt collection chamber, a primary inlet in communication with that first chamber, a second dirt collection chamber, a secondary inlet in communication with that second chamber and a chamber outlet. The spiral air guide includes an inlet in fluid communication with the first chamber outlet, at least one clean air discharge orifice along an inside portion of the spiral air path and an outlet in fluid communication with the second dirt collection chamber through the secondary inlet. The inlet is provided at a first end of the spiral air path and the outlet is provided at a second end of the spiral air path. The spiral air guide comprises a spiral, tubular conduit.

In one possible embodiment the spiral air path has a substantially constant cross sectional area from the first end to the second end. That cross sectional area is between about 250 mm² and about 1000 mm². In another possible embodiment the spiral air path has a cross sectional area that decreases from the first end to the second end. In yet another possible embodiment the spiral air path has a cross sectional area that increases from the first end to the second end. The spiral air path may also be substantially flat.

The dirt collection vessel may further include a clean air manifold in fluid communication with the at least one clean air discharge orifice. The clean air manifold includes a manifold outlet in fluid communication with the suction generator. Further the spiral air guide partitions the dirt collection vessel into the dirt collection chamber and the clean air manifold.

Still further describing the invention, the inlet, the at least one clean air discharge orifice and the outlet have cross sectional areas with a ratio of between about 10 to about 1 to about 10 and about 1 to about 1 to about 1. The inlet has a cross sectional area of between about 250 mm² to about 1000 mm². The at least one discharge orifice has a cross sectional area of between about 20 mm² to about 360 mm². Finally the outlet has a cross sectional area of between about 250 mm² to about 500 mm².

In one possible embodiment of the invention the first dirt collection chamber is substantially cylindrical in shape and the primary inlet is tangentially directed with respect to the first dirt collection chamber. The chamber outlet is axially directed with respect to the dirt collection chamber. Further the chamber outlet includes a sieve having about 1000 to about 1500 apertures and each of the apertures has a cross sectional area of between about 2.3 mm² to about 6.4 mm².

Still further describing the invention the housing includes a nozzle assembly and a canister assembly. The suction inlet is provided on the nozzle assembly and at least one rotary agitator is provided adjacent that suction inlet. The vacuum cleaner of the present invention may be of the canister type or of the upright type wherein the canister assembly is pivotally connected to the nozzle assembly. Still further a secondary filter may be provided between the manifold outlet and the suction generator. In addition a final filter may be provided downstream from the suction generator.

In the following description there are shown multiple preferred embodiments of the invention simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING FIGURES

The accompanying drawing incorporated in and forming a part of the specification, illustrates several aspects of the present invention, and together with the description serves to explain certain principles of the invention. In the drawing.

Reference will now be made in detail to the present preferred embodiments of the invention, examples of which are illustrated in the accompanying drawing.

DETAILED DESCRIPTION OF THE INVENTION

Figure 1:
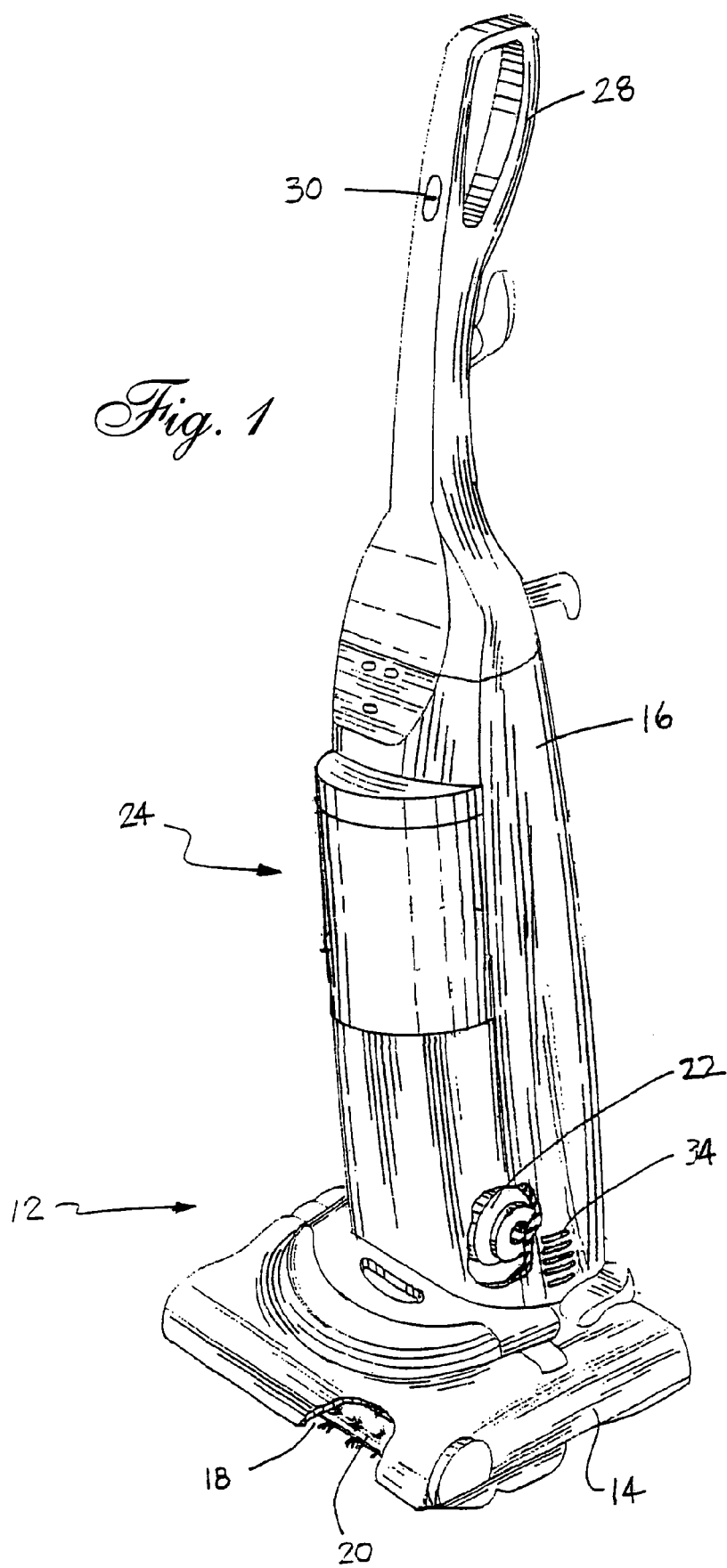
FIG. 1 is a perspective view of a vacuum cleaner of the present invention.

Reference is now made to FIG. 1 illustrating one possible embodiment of the vacuum cleaner 10 of the present invention. The illustrated embodiment is an upright vacuum cleaner 10. It should be appreciated, however, that the present invention also includes and this patent covers canister and handheld bagless vacuum cleaners.

The illustrated vacuum cleaner 10 includes a housing, generally designated by reference numeral 12. That housing 12 includes a nozzle assembly or section 14 and a canister assembly or section 16. As is known in the art, the canister assembly 16 is pivotally connected to the nozzle assembly 14 to aid the operator in manipulating the vacuum cleaner to and fro across the floor. Wheels (not shown) carried on the housing 12 allow the vacuum cleaner 10 to be moved smoothly across the floor.

As illustrated, the nozzle assembly 14 is equipped with a nozzle or suction inlet 18. In the illustrated embodiment, the suction inlet 18 also includes a rotary agitator 20. The rotary agitator 20 is equipped with projecting cleaning structures such as bristle tufts, brushes, wipers, beater bars or the like to aid in stripping dirt and debris from a nap of an underlying carpet being cleaned.

Figure 2:
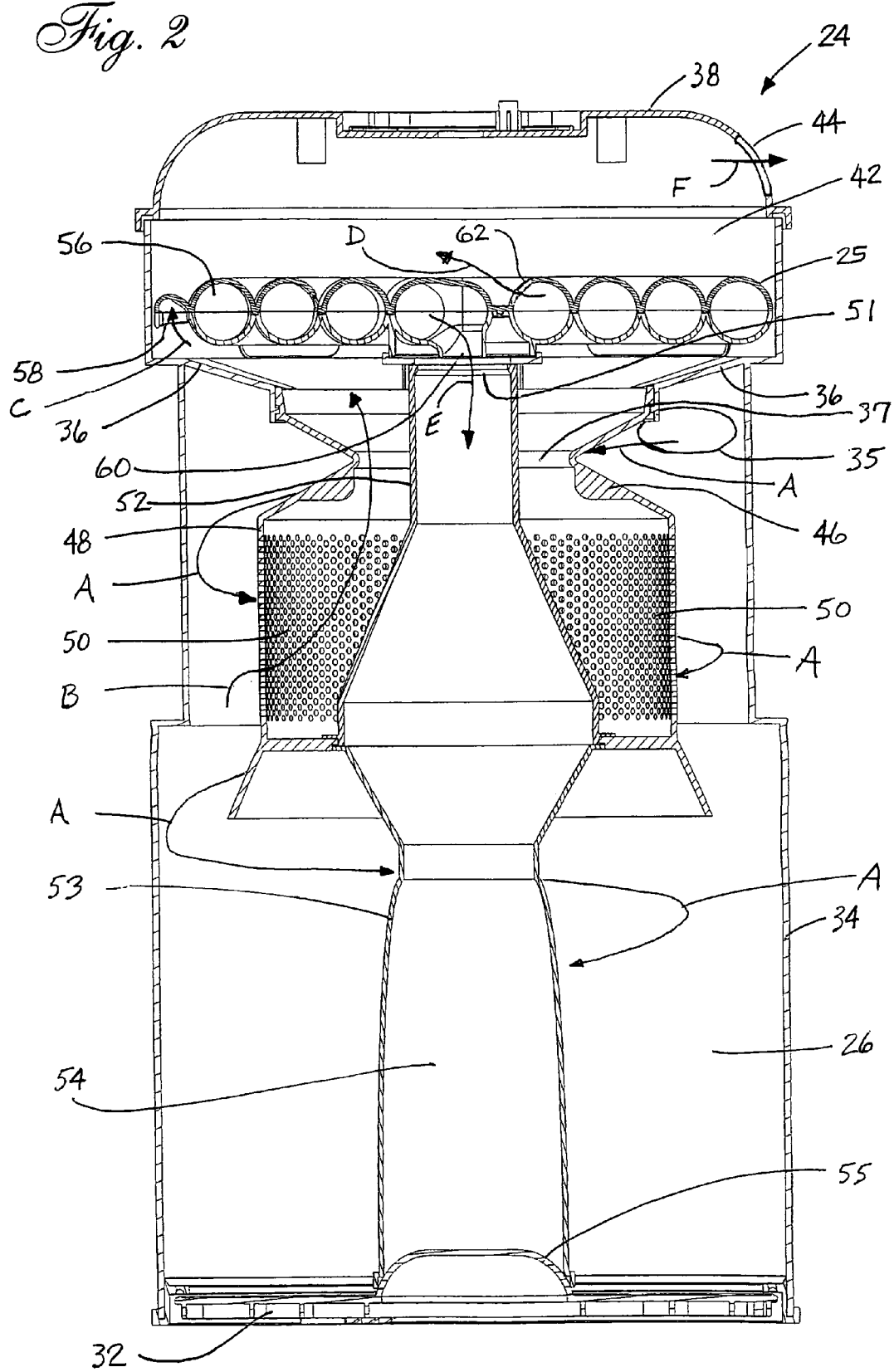
FIG. 2 is a detailed cross sectional view of the dirt collection vessel of the present invention.

The canister assembly 16 houses a suction generator 22 (i.e. a fan and motor assembly) and a dirt collection vessel 24 including a spiral air guide 25 and a dirt collection chamber 26 (see FIG. 2). The details of the dirt collection vessel 24 will be described in greater detail below. The canister assembly 16 also includes a control handle 28 and an actuator switch 30 for turning the vacuum cleaner 10 on and off and thereby driving the rotary agitator 20 and the suction generator 22.

As best illustrated in FIG. 2, the dirt collection vessel 24 includes a main body comprising a bottom wall 32 and a curved side wall 34. In the illustrated embodiment, the bottom wall 32 comprises a door that is pivotally mounted to the side wall 34 and secured in a closed position by a latch (not shown). The latch may be actuated to open the door 32 and empty dirt and debris from the dirt collection chamber 26 when desired, in a manner well known in the art. The dirt collection vessel 24 also includes a tangentially directed inlet 35 and an axially directed chamber outlet 37. A shoulder 36 formed in the curved side wall 34 supports the spiral air guide 25. A lid 38 seats on the upper edge of the side wall 34 and seals the open end 40 of the main body.

As should be appreciated, the spiral air guide 25 functions to partition the dirt collection vessel 24 into the dirt collection chamber 26 and the clean air manifold 42. A manifold outlet 44 in the lid 38 provides fluid communication between the clean air manifold 42 and the suction generator 22 through a conduit 45.

As further illustrated in FIG. 2, the shoulder 36 also receives and holds a sieve 46. The sieve 46 is substantially cylindrical in shape and is concentrically received within the curved side wall 34 of the main body of the dirt collection vessel 24. As illustrated the sieve 46 includes an outer wall 48 incorporating a series of apertures 50. More specifically, the sieve 46 includes between about 1000 to about 1500 apertures 50 and each aperture has a cross sectional area of between about 2.3 mm$^2$ to about 6.4 mm$^2$. The apertures 50 may be round, oval, multisided or substantially any shape.

The sieve 46 includes an inner wall 52 that engages a tubular element 53. The tubular element 53 is concentrically received within the side wall 34 of the dirt collection vessel 24. The bottom of the tubular element 53 is closed by a convexity 55 in the bottom wall or door 32. A second dirt collection chamber 54 is defined inside the inner wall 52 and tubular element 53 above the convexity 55. Thus, it should be appreciated that the chamber outlet 37 is annular in shape and extends around the second dirt collection chamber 54.

The spiral air guide 25 comprises a substantially-flat, spiral, tubular conduit 56. The spiral tubular conduit 56 has an inlet 58 at a first end and an outlet 60 at a second end. The inlet 58 is provided in fluid communication with the sieve 46 while the outlet 60 is provided in fluid communication with the second dirt collection chamber 54 through the secondary inlet 51.

Figure 3:
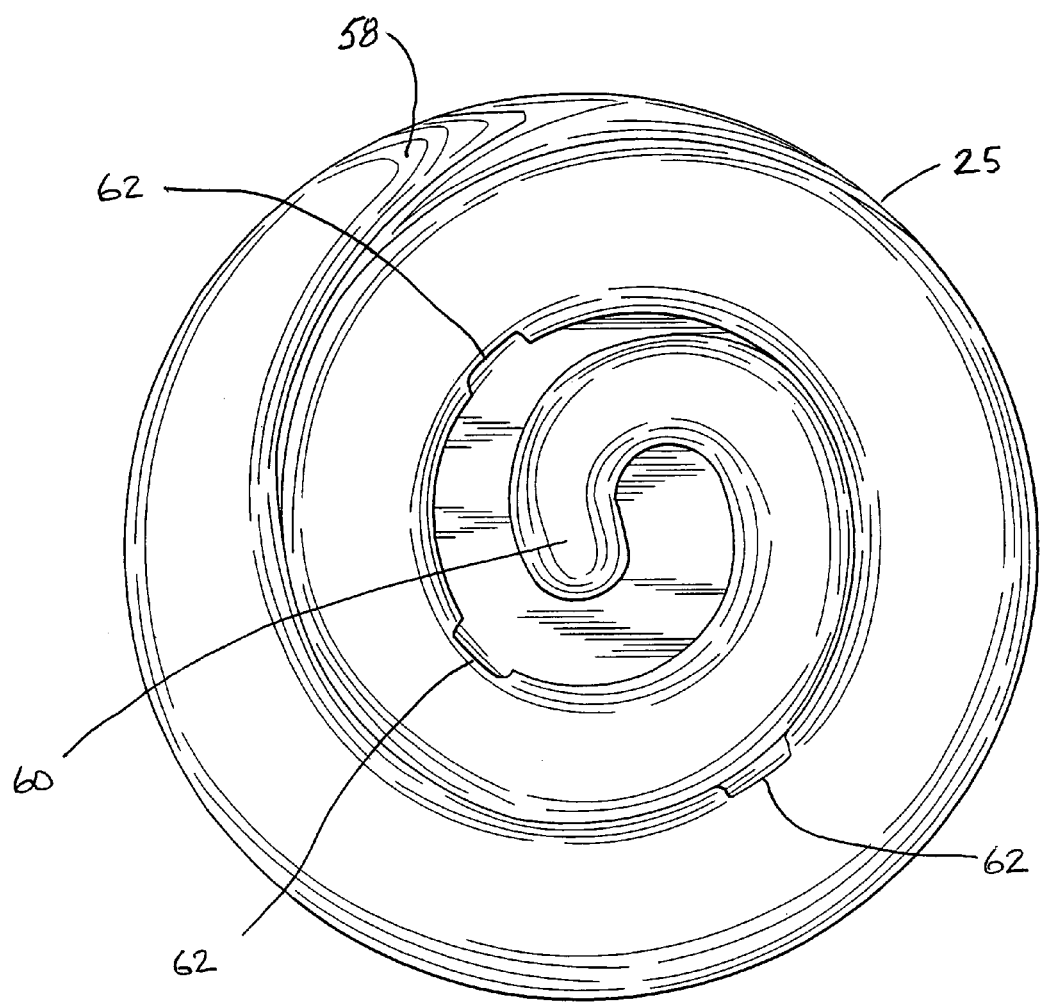
FIG. 3 is a detailed top plan view of the spiral air guide.

The spiral tubular conduit 56 may have a substantially constant cross sectional area from the first end to the second end of from about 250 mm$^2$ to about 1000 mm$^2$. In one possible alternative embodiment the spiral tubular conduit may define a spiral air path having a cross sectional area that decreases from the first end to the second end. In yet another alternative embodiment the spiral tubular conduit 56 may define a spiral air path that has a cross sectional area that increases from the first end to the second end. In any of these embodiments, the spiral air guide 25 includes at least one clean air discharge orifice 62 (note three such orifices shown in drawing FIG. 3) along an inside portion of the spiral air path defined by the spiral tubular conduit 56. The inlet 58, the discharge orifices 62 and the outlet 60 have cross sectional areas with a ratio of between about 10 to about 1 to about 10 and about 1 to about 1 to about 1. More specifically, the inlet 58 has a cross sectional area of between about 250 mm$^2$ to about 1100 mm$^2$. The discharge orifices 62 have a combined cross sectional area of between about 60 mm$^2$ to about 1100 mm$^2$ and the outlet 60 has a cross sectional area of between about 250 mm$^2$ to about 500 mm$^2$.

Figure 4:
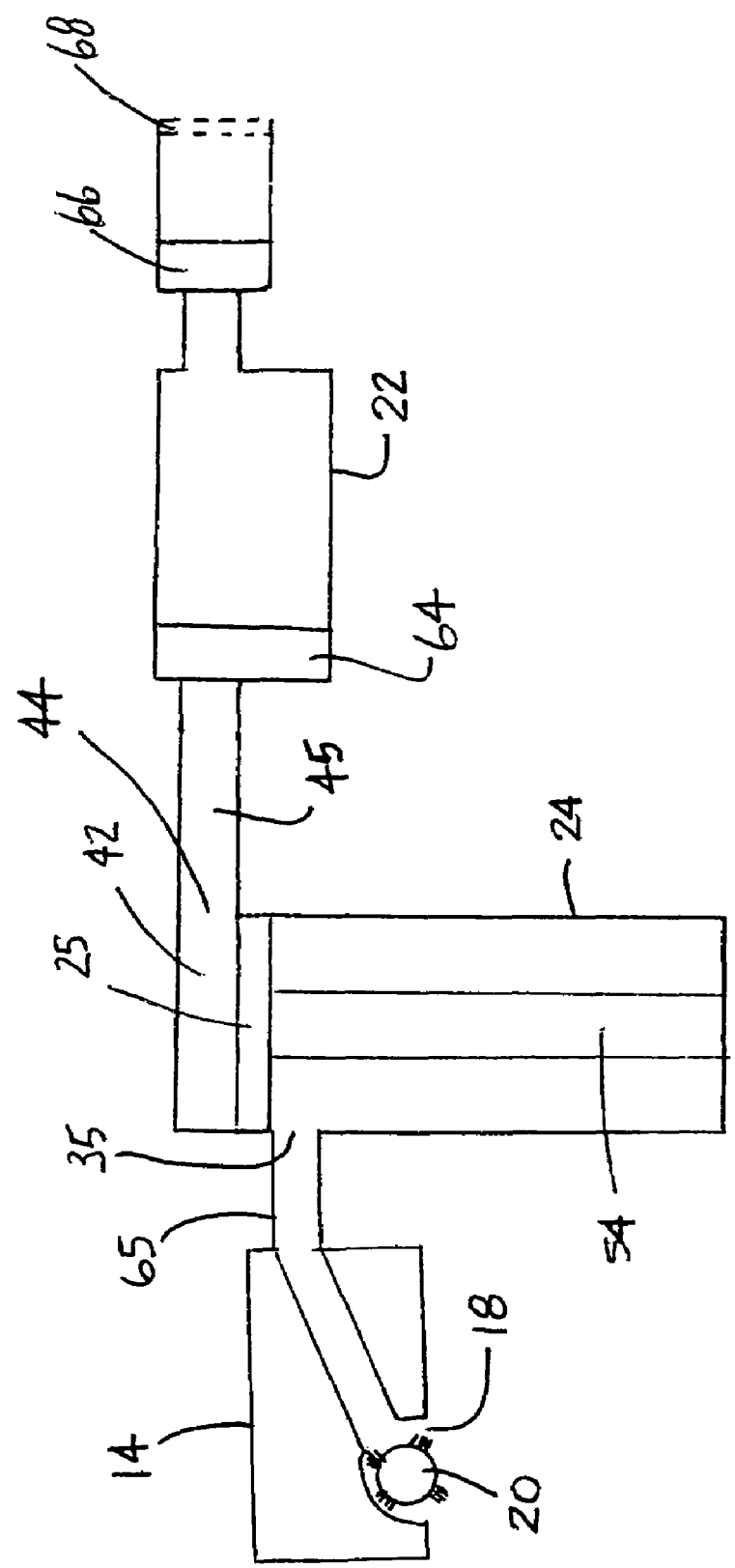
FIG. 4 is a schematical air flow diagram for the vacuum cleaner of the present invention.

During operation the rotary agitator 20 beats dirt and debris from the nap of an underlying carpet being cleaned (see FIG. 4). That dirt and debris is drawn in an airstream into the vacuum cleaner 10 through the suction inlet 18 by means of the suction generator 22. After passing through a conduit 65, the airstream entrained with dirt and debris is delivered through the tangentially directed inlet 35 into the dirt collection chamber 26 of the dirt collection vessel 24 (see also FIG. 2). The resulting cyclonic air flow (note action arrows A) tends to force the dirt and debris toward the side wall 34 of the dirt collection vessel 24 while the relatively clean air is drawn through the apertures 50 of the sieve 46 past the chamber outlet 37 (note action arrow B). The airstream then passes through the inlet 58 into the spiral tubular conduit 56 of the spiral air guide 25 (note action arrow C).

As the airstream travels through the conduit 56 it is drawn into a tighter and tighter circle and is thereby accelerated. Any fine dirt particles that were capable of passing through the apertures 50 are forced against the outside portion of the spiral air path while relatively clean air along the inside portion of the spiral air path is drawn through the discharge orifices 62 into the clean air manifold 42 (note action arrow D). The remaining fine dirt particles forced to travel along the outer portion of the spiral air path of the conduit 56 exit the outlet 60 at the second end of the spiral air guide 25 and are delivered directly into the second or fine particle dirt collection chamber 54 through the secondary inlet 51 (note action arrow E). Consequently, it should be appreciated that the spiral air guide 25 functions to insure that even the finest dirt particles are captured in the dirt collection vessel 24.

The now clean air delivered to the clean air manifold 42 passes through the manifold outlet 44 (note action arrow F) and then moves along a conduit 45 through a secondary filter 64 before being delivered to the suction generator 22. As the clean air passes through the suction generator 22 it functions to cool the motor of the suction generator. The clean air is then exhausted through a final filter 66, such as a HEPA filter to remove any remaining particles such as carbon particles from the motor brushes, before being discharged back into the environment through the exhaust port 68.

As should be appreciated, the spiral air guide 25 functions to return relatively fine dirt particles to the second chamber 54 of the dirt collection vessel 24 for capture and disposal thereby stripping those particles from the clean air subsequently delivered through the secondary filter 64 to the suction generator 22. As such, the air guide functions to enhance the cleaning efficiency of the vacuum cleaner 10.

The foregoing description of a preferred embodiment of the present invention has been presented for purposes of illustration and description. It is not intended to be exhaustive or to limit the invention to the precise form disclosed. Obvious modifications or variations are possible in light of the above teachings. For example, while the illustrated embodiment incorporates a cylindrically shaped dirt collection chamber 26, a tangentially directed inlet 35 and an axially directed outlet 37 in order to provide for cyclonic airflow, the invention is not limited to such an arrangement. The dirt collection chamber 26 may assume another shape. The inlet 35 need not be tangentially directed and the outlet 37 need not be axially oriented. Thus, the invention incorporates both cyclonic and noncyclonic designs.

Figure 5:
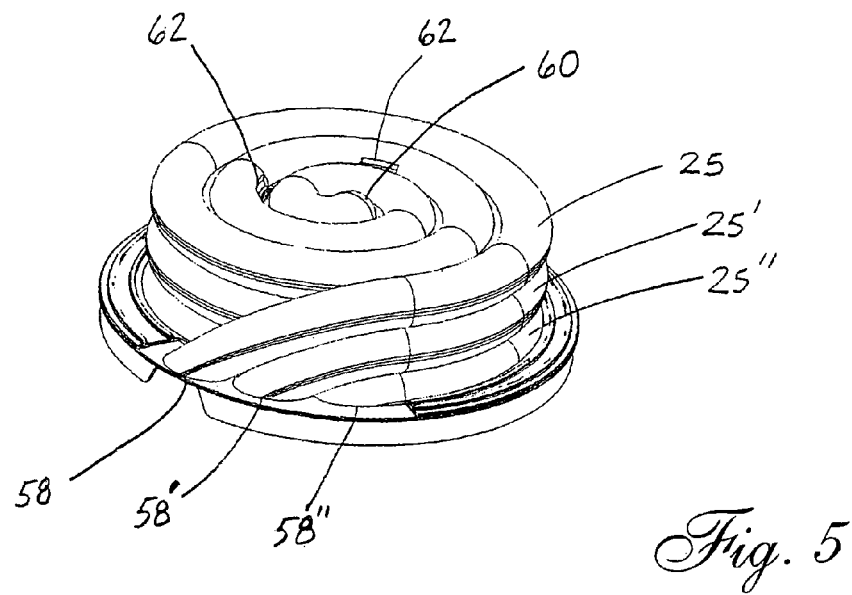
FIG. 5 is a perspective view of an alternative embodiment showing three, stacked spiral air guides.
Figure 6:
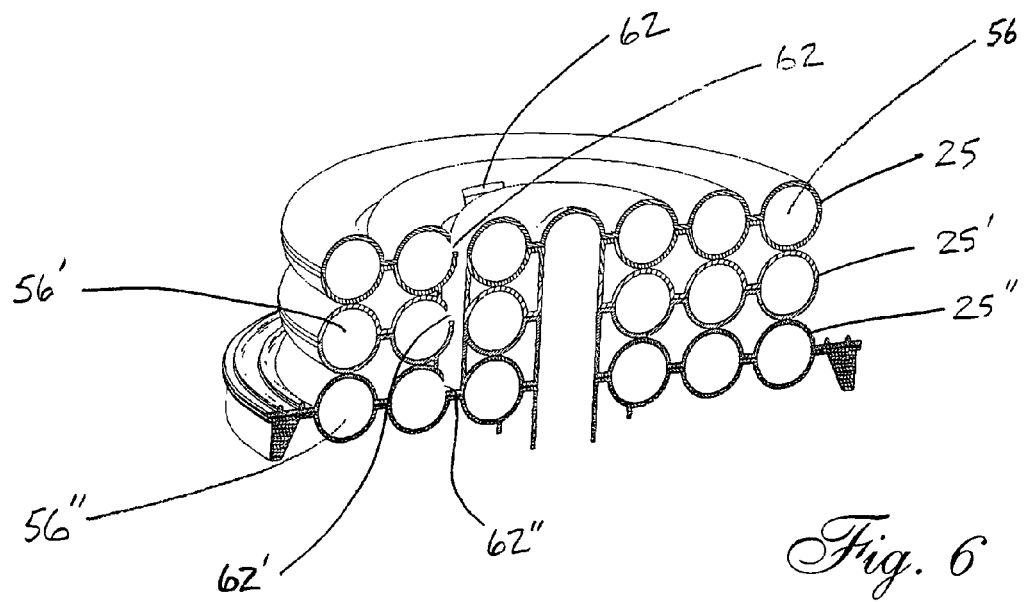
FIG. 6 is a cross sectional view of the stacked spiral air guides illustrated in FIG. 5.

Further, as illustrated in FIGS. 5 and 6, the invention may incorporate multiple spiral air guides 25, 25', 25". As illustrated the three spiral air guides 25, 25', 25" are stacked. Each air guide 25, 25', 25" includes its own tubular conduit 56, 56', 56", inlet 58, 58', 58", outlet 60 (only one shown in FIG. 5) and discharge orifices 62, 62', 62".

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims and their fair and broad interpretation in any way.

What is claimed is:

1. A vacuum cleaner, comprising:
   a housing including a suction inlet;
   a dirt collection vessel carried on said housing, said dirt collection vessel including a dirt collection chamber;
   a spiral air guide providing a spiral air path; and
   a suction generator carried on said housing, said suction generator being in fluid communication with said suction inlet, said dirt collection vessel and said spiral air guide;
   said spiral air guide being characterized by including a spiral, tubular conduit having an inlet at a first end, an outlet at a second end and at least one clean air discharge orifice along an inside portion of said spiral air path between said inlet and said outlet.

2. The vacuum cleaner of claim 1, wherein said dirt collection vessel includes a first dirt collection chamber, a primary inlet in communication with said first dirt collection chamber, a second dirt collection chamber, a secondary inlet in communication with said second dirt collection chamber and a chamber outlet.

3. The vacuum cleaner of claim 1, wherein said spiral, tubular conduit and said spiral air path has a substantially constant cross sectional area from said first end to said second end.

4. The vacuum cleaner of claim 3, wherein said spiral air path has a cross sectional area of between about 250 mm$^2$ and about 1000 mm$^2$.

5. The vacuum cleaner of claim 1, wherein said spiral air path has a cross sectional area that decreases from said first end to said second end.

6. The vacuum cleaner of claim 1, wherein said spiral air path has a cross sectional area that increases from said first end to said second end.

7. The vacuum cleaner of claim 1, wherein said spiral air path is substantially flat.

8. The vacuum cleaner of claim 7, wherein said dirt collection vessel further includes a clean air manifold in fluid communication with said at least one clean air discharge orifice.

9. The vacuum cleaner of claim 8, wherein said clean air manifold includes a manifold outlet in fluid communication with said suction generator.

10. The vacuum cleaner of claim 9, wherein said spiral air guide partitions said dirt collection vessel into said dirt collection chamber and said clean air manifold.

11. The vacuum cleaner of claim 1, wherein said inlet, said at least one clean air discharge orifice and said outlet have cross sectional areas with a ratio of between about 10 to about 1 to about 10 and about 1 to about 1 to about 1.

12. The vacuum cleaner of claim 1, wherein said inlet has a cross sectional area of between about 250 mm$^2$ to about 1000 mm$^2$, said at least one discharge orifice has a cross sectional area of between about 20 mm$^2$ to about 360 mm$^2$ and said outlet has a cross sectional area of between about 250 mm$^2$ to about 360 mm$^2$.

13. The vacuum cleaner of claim 2, wherein said first dirt collection chamber is substantially cylindrical in shape, said primary inlet is tangentially directed with respect to said first dirt collection chamber and said chamber outlet is axially directed with respect to said first dirt collection chamber.

14. The vacuum cleaner of claim 13, wherein said chamber outlet includes a sieve having between about 1000 to about 1500 apertures and each of said apertures has a cross sectional area of between about 2.3 mm$^2$ to about 6.4 mm$^2$.

15. The vacuum cleaner of claim 1, wherein said housing includes a nozzle assembly and a canister assembly.

16. The vacuum cleaner of claim 15, wherein said suction inlet is provided on said nozzle assembly and at least one rotary agitator is provided adjacent said suction inlet.

17. The vacuum cleaner of claim 16, wherein said canister assembly is pivotally connected to said nozzle assembly.

18. The vacuum cleaner of claim 17, wherein a secondary filter is provided between said manifold outlet and said suction generator.

19. The vacuum cleaner of claim 18, wherein a final filter is provided downstream from said suction generator.

20. The vacuum cleaner of claim 1, including multiple spiral air guides.

* * * * *